(12) United States Patent
Daniels et al.

(10) Patent No.: US 9,034,086 B2
(45) Date of Patent: May 19, 2015

(54) VENTLESS TANK SYSTEM

(71) Applicants: Danny Daniels, Tishomingo, OK (US);
Vernon Daniels, Tishomingo, OK (US)

(72) Inventors: Danny Daniels, Tishomingo, OK (US);
Vernon Daniels, Tishomingo, OK (US)

(73) Assignee: Nitro-Lift Hydrocarbon Recovery Systems, LLC, Norman, OK (US)

( * ) Notice: Subject to any disclaimer, the term of this patent is extended or adjusted under 35 U.S.C. 154(b) by 202 days.

(21) Appl. No.: 13/677,493

(22) Filed: Nov. 15, 2012

(65) Prior Publication Data

US 2014/0130676 A1  May 15, 2014

(51) Int. Cl.
*B01D 19/00*  (2006.01)

(52) U.S. Cl.
CPC .................................. *B01D 19/0042* (2013.01)

(58) Field of Classification Search
CPC .................................................. B01D 19/0042
USPC .............. 96/184; 95/248, 253, 247, 249, 250
See application file for complete search history.

(56) References Cited

U.S. PATENT DOCUMENTS

| | | | | |
|---|---|---|---|---|
| 2,738,026 A * | 3/1956 | Glasgow et al. | ................. | 95/158 |
| 2,765,045 A * | 10/1956 | Meyers | ........................... | 95/176 |
| 3,360,903 A * | 1/1968 | Meyer | ............................ | 96/157 |
| 4,010,012 A * | 3/1977 | Griffin et al. | ................... | 96/159 |
| 4,948,393 A * | 8/1990 | Hodson et al. | ................. | 95/250 |
| 5,149,344 A * | 9/1992 | Macy | ............................. | 96/159 |
| 5,928,519 A * | 7/1999 | Homan | ......................... | 210/741 |
| 6,537,458 B1 * | 3/2003 | Polderman | ..................... | 210/801 |
| 7,531,099 B1 * | 5/2009 | Rhodes | .......................... | 210/800 |
| 7,654,397 B2 * | 2/2010 | Allouche | ......................... | 96/157 |
| 8,470,080 B1 * | 6/2013 | Ball et al. | ........................ | 95/253 |
| 2009/0282985 A1 * | 11/2009 | Whiteley | ........................ | 96/189 |

* cited by examiner

*Primary Examiner* — Duane Smith
*Assistant Examiner* — Cabrena Holecek
(74) *Attorney, Agent, or Firm* — Tomlinson Rust McKinstry Grable

(57) ABSTRACT

A tank system for capturing fluids from an oil or gas well. The system comprises a series of tanks adapted to step down the temperature and pressure of well products from a fossil fuel well while removing gas products until the liquid products contain less dissolved gas in a tank than they could contain at ambient temperature and pressure. Therefore, no venting of gas takes place during the separation. An oil-gas separator is provided within the tank system to separate organic products from non-organic products. Gas products may be flared or delivered for further processing.

23 Claims, 4 Drawing Sheets

VENTLESS TANK SYSTEM

FIELD OF THE INVENTION

The present invention relates to the field of oil and gas wells, and more particularly to vessels or tanks for capturing fluids and gases from a well.

SUMMARY OF THE INVENTION

In one embodiment the present invention is directed to a tank system for managing a slurry containing an organic gas. The tank system comprises a first tank body, a flow interrupter, a sand separator, a flare line, and a secondary tank. The first tank body is characterized by an internal first pressure and comprises a main inlet port, a gas outlet port, and a liquid outlet port. The flow interrupter is located within the first tank body proximate the main inlet port. The sand separator is located within the first tank body. The flare line is operatively connected to the gas outlet port. The secondary tank is in communication with the liquid outlet port, wherein the conditions in the batch tank are such that liquid in the secondary tank has less organic gas dissolved in solution than exists at equilibrium at standard temperature and pressure.

In an alternative embodiment the present invention is directed to a tank system for capturing fluids from a well. The system comprises a trailer, a tank body supported on the trailer, a gas buster line, a flare line, a pipe section having a first end connected to the main inlet port, a separator supported on the trailer, and a sand trap supported on the trailer. The tank body comprises a main inlet port proximate a top portion of the tank body and a vent port disposed on a top of the tank body. The gas buster line disposed within the tank body, the line comprising a first pipe section having a length and a diameter and a second pipe section having a length and a diameter. The first pipe section is connected at a first end to the main inlet port and the second pipe section is connected at a first end to a second end of the first pipe section. The length of the second pipe section is greater than the length of the first pipe section and the diameter of the second pipe section is greater than the diameter of the first pipe section. The second pipe section is characterized by a plurality of slots cut in a circumference of the pipe section, the slots allowing fluids in the second pipe section to disperse out of the second pipe section. The flare line is operatively connected to the vent port. The flare line comprises at least one pipe section having an end connected to the vent port, a check valve connected to the at least one pipe section, and an ignition system connected to the at least one pipe section and adapted to burn gases passing through the at least one pipe section. The separator has an inlet port and an outlet port, where the outlet port is operatively connected to a second end of the pipe section connected to the main inlet port. The sand trap has an inlet port and an outlet port, where the outlet port operatively connected to inlet port of the separator.

DETAILED DESCRIPTION OF THE DRAWINGS

The present invention is directed to a tank system for handling fluids and gases extracted from a well. The system design allows the operator of an oil or gas well to flow the well into the tank while attempting to eliminate the scope of harmful vapors unburned to the atmosphere. The system includes a pressure rated vessel and incorporates relief valves to maintain the structural integrity of the vessel by reducing by over pressuring or over vacuuming. Gases from the tank are vented through a flare stack with an ignition source to burn gases before release to the atmosphere. The system also incorporates gas separator and sand trap technology to increase functionality.

Figure 1:
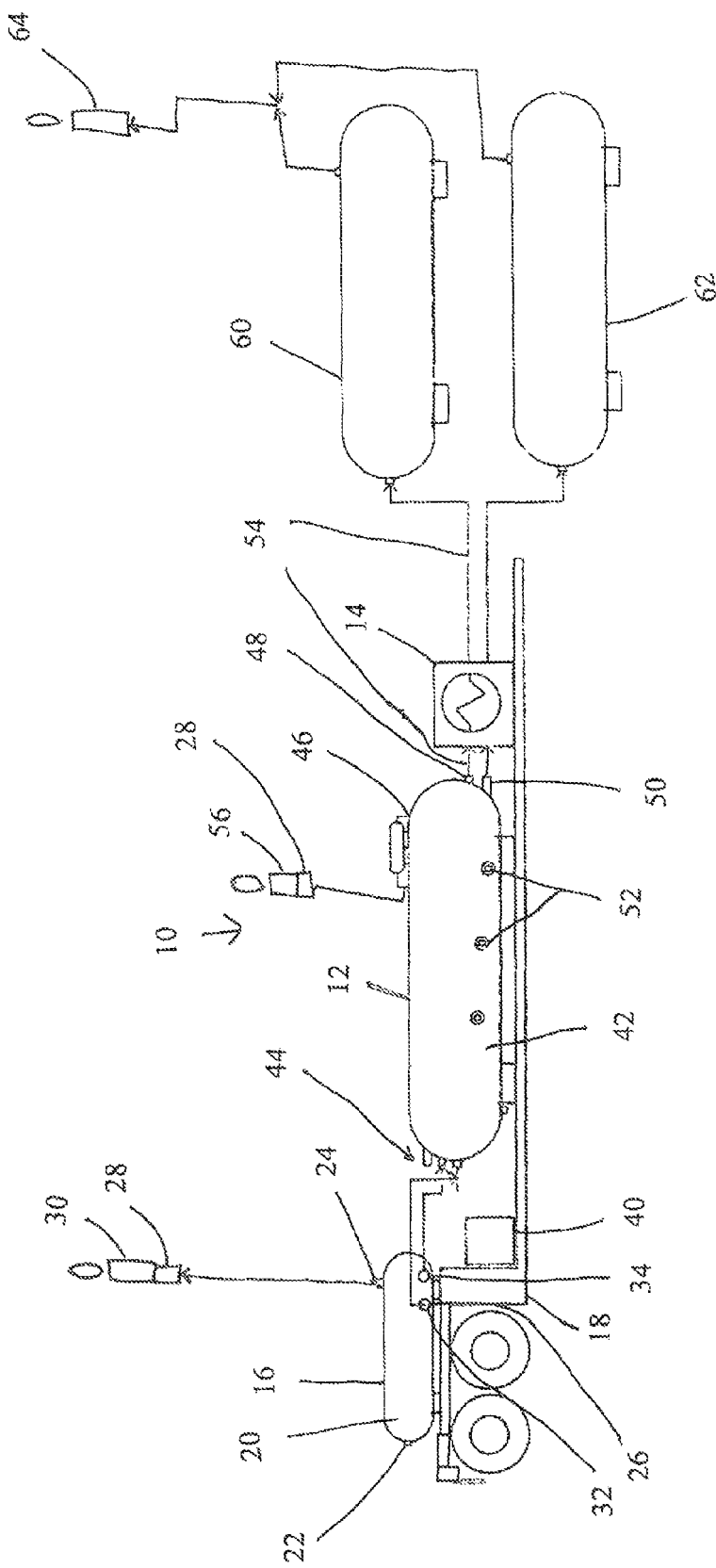
FIG. 1 is a diagrammatic representation of a ventless tank system supported on a trailer.
Figure 3:
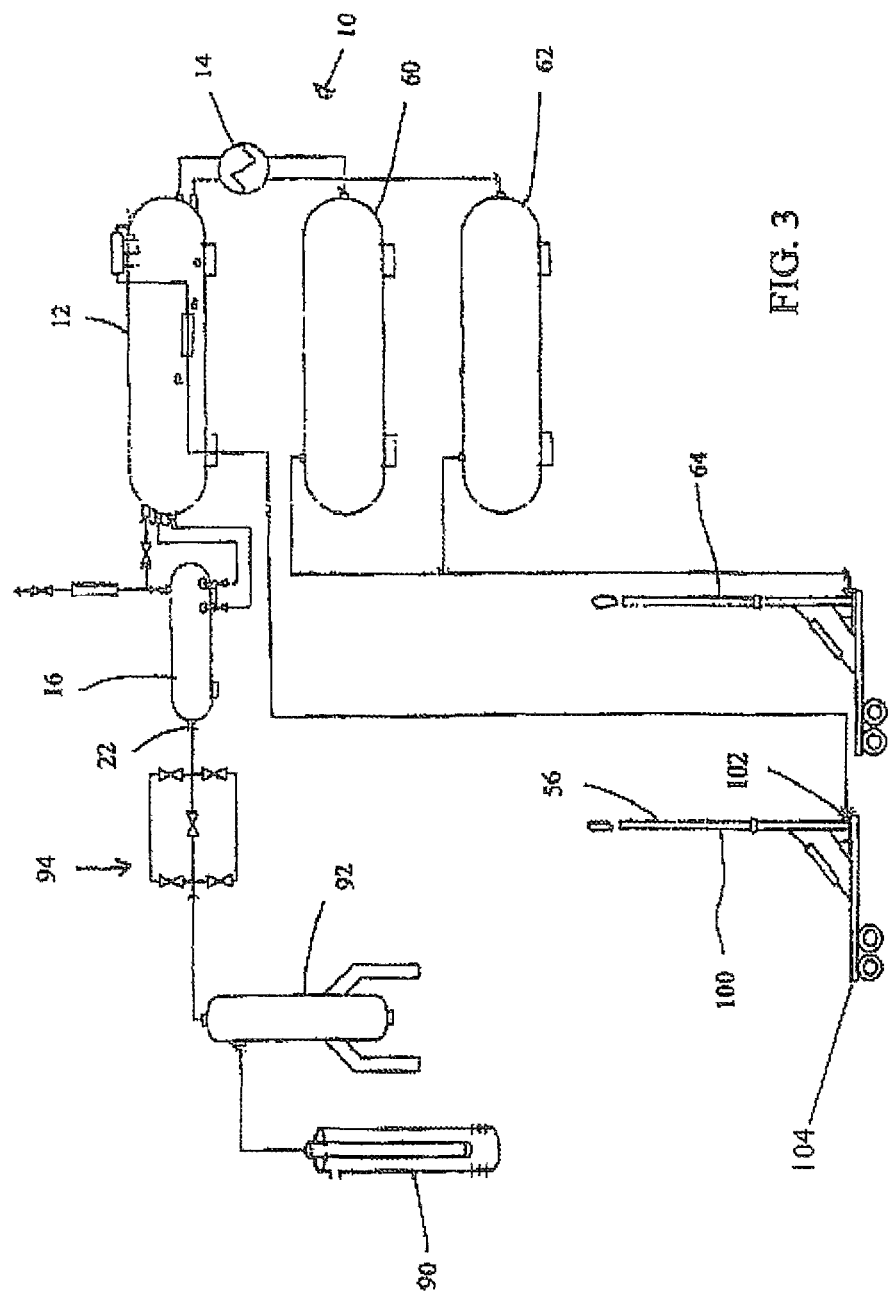
FIG. 3 is a diagrammatic schematic of the ventless tank system.

Turning to the drawings in general and FIG. 1 in particular, there is shown therein a ventless tank system 10 built in accordance with the present invention. The system 10 comprises a batch tank 12, a heat exchanger 14, and a three-phase separator 16 adapted to handle fluids, oil, gas, or other induced fluids. Preferably, the batch tank 12, the heat exchanger 14, and the separator 16 are all supported on a trailer 18 suitable for towing by a vehicle. The system 10 is arranged on the trailer 18 for connection to a well (FIG. 3). Gas or fracturing fluid enters the system 10 through the well and is routed through components of the system 10.

The three-phase separator 16 is adapted to receive a feed stream from the well at high pressure. The feed stream is referred to as a "brine", containing gas and liquid portions, and potentially some solid particulates. The phrase "slurry" is also used herein to describe an oil-water mixture, including additional entrained gas, as described below. The three-phase separator 16 comprises a separator tank body 20, a separator inlet port 22, a separator gas outlet port 24, and a separator liquid outlet port 26. The feed stream from the well is received at the separator inlet port 22. An internal pressure of the separator tank body 20 is preferably lower than the pressure of the feed stream. The pressure drop allows gaseous and liquid portions to separate within the separator tank body 20. The gaseous portion typically comprises a volatile organic compound (VOC) such as methane gas, which will be referred to herein simply as "gas". Gas exits via the separator gas outlet port 24. Gas exiting the separator gas outlet port 24 is directed to a meter 28 and then to a flare 30. Alternatively, the gas may be utilized for sales or further processing.

Liquid exits the three-phase separator 16 at a separator liquid outlet port. As shown in FIG. 1, oil and water may be separated within the three-phase separator 16 and exit the separator at a separator water outlet port 32 and a separator oil outlet port 34. An internal oil/water separator (not shown) may be used to separate the oil and the water within the three-phase separator 16. Preferably, the system 10 comprises a nitrogen membrane system 40. The membrane system 40 uses inert nitrogen gas to control the separator gas outlet port 24, separator water outlet port 32 and separator oil outlet port 34. One skilled in the art will appreciate that use of inert nitrogen rather than gas captured from the system 10 will further prevent venting of natural gas into the atmosphere.

The batch tank 12 comprises a batch tank body 42, a batch tank inlet port 44, a batch tank gas outlet port 46, a batch tank oil outlet 48, a batch tank water outlet 50, and at least one sand clearout port 52. The batch tank body 42 may further comprise a plurality of pop off valves, manways, and cleanouts to facilitate use. Oil and water enter the batch tank body 42 at the tank inlet port 44. The tank inlet port 44 may comprise separate inlet ports for oil and water, or the inlet port may contain both oil and water. An internal pressure of the batch tank body 42 is preferably lower than the pressure of the separator tank body 20. The pressure drop allows further separation of gas entrained in the oil and water. Gas exits via the batch tank gas outlet port 46. Gas exiting the batch gas outlet port 46 is directed to the meter 28 and then to a flare 56. Alternatively, the gas may be utilized for sales or further processing.

Figure 2:
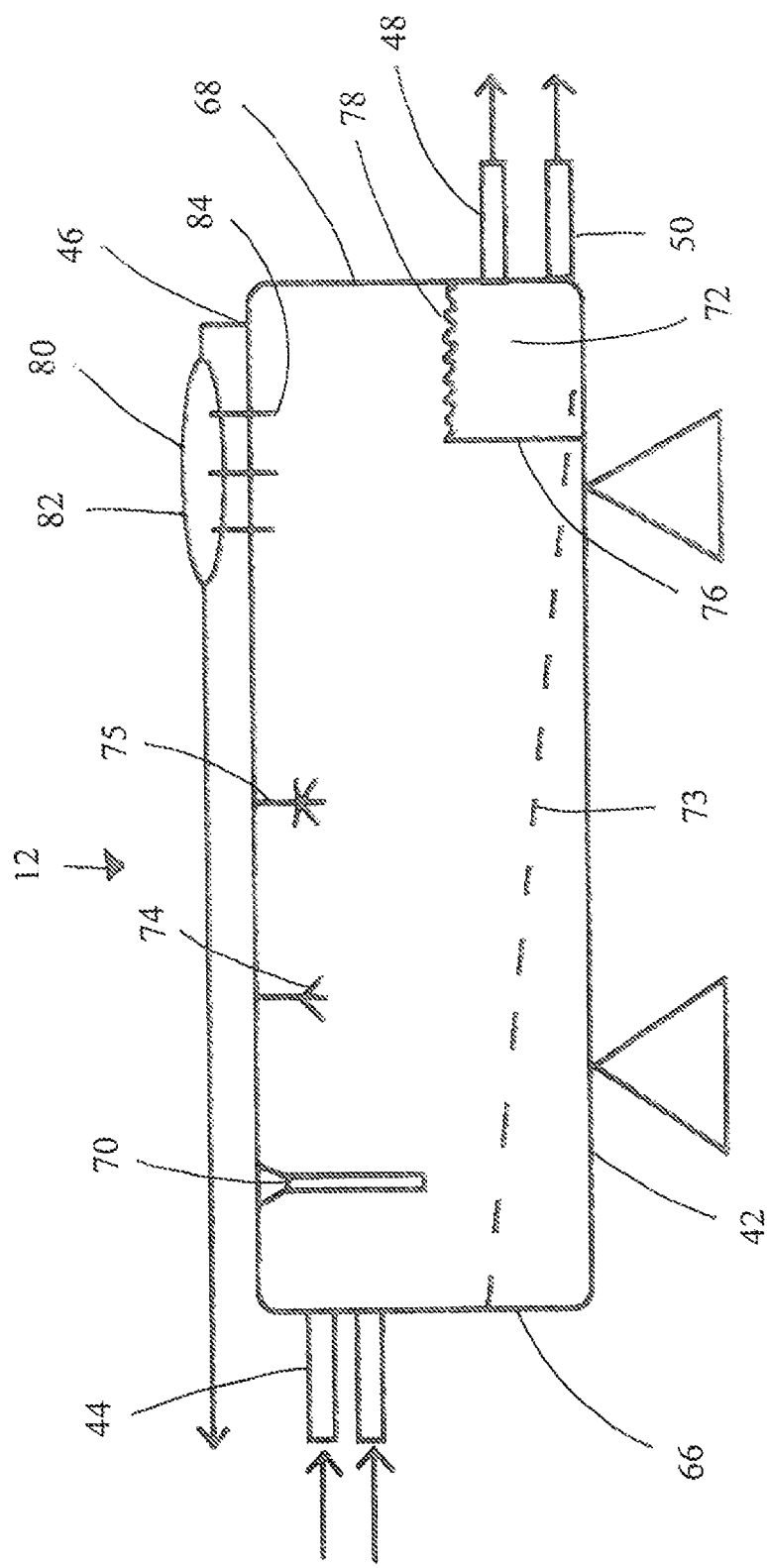
FIG. 2 is a side cutaway view of a batch tank for use with the ventless tank system of FIG. 1.

Liquid in the batch tank body 42 may be separated into oil and water using an oil/water separator (FIG. 2). Alternatively, oil and water may remain separated in the batch tank 12 after separation due to the three-phase separator 16. Oil exits the batch tank body 42 via the batch tank oil outlet 48. Water exits the batch tank body 42 via the batch tank water outlet 50.

Sand entrained in the oil and water may accumulate at the bottom of the batch tank body 42 due to a sand separator (FIG. 2) that will be described in more detail below. The at least one sand clearout port 52 is provided to lower the level of sand within the batch tank body 42. As shown, the batch tank 12 comprises more than one clearout port 52. Multiple clearout ports 52 are provided at different levels, such that sand can be removed from the batch tank 12 without risking venting of gas into the atmosphere.

Oil and water removed from the batch tank 12 is delivered through one or more liquid transmission lines 54 to heat exchanger 14. Heat exchanger 14 removes heat from the oil and the water. Oil is then deposited in a secondary tank, or oil tank 60. Water is deposited in a secondary tank, or water tank 62. In both cases, the equilibrium conditions (temperature and pressure) inside the oil tank 60 and the water tank 62 are less favorable for entrained gas than ambient temperature and pressure. Gas removed from the oil tank 60 and the water tank 62 is sent to a low pressure flare line 64. Alternatively, the gas may be utilized for sales or further processing.

One skilled in the art will appreciate that oil removed from the oil tank 60 and water removed from the water tank 62 may require further processing before it can be used or disposed of. However, the oil removed after this phase and the water removed after this phase will not vent gas to the atmosphere. The amount of gas dissolved in the oil or water will be lower than at equilibrium at ambient conditions. This undersaturation of gas allows the water and oil to be stored outside of a ventless tank. A second heat exchanger (not shown) may additionally be utilized between the three-phase separator 16 and the batch tank 12 to achieve further cooling of the streams and therefore favorable equilibrium conditions.

With reference now to FIG. 2, the batch tank 12 is shown in more detail. Specifically, internal components of the batch tank body 42 are shown. The batch tank body 42 defines a first end 66 and a second end 68 and comprises a flow interrupter 70, an oil-water separator 72, a sand separator 73, a static tree 74, and a mist collector 75. The flow interrupter 70 is positioned such that a slurry stream entering the batch tank body 42 at the batch tank inlet port 44 contacts the flow interrupter. This causes liquid elements, such as oil and water, to drop to the bottom of the batch tank body 42 while gas elements remain proximate the top of the batch tank body. The flow interrupter 70 may comprise any solid object locatable proximate the tank inlet port 44, such as a sheet of metal such as a deflector plate. One skilled in the art will appreciate that a gas buster line or similar means may be utilized as a flow interrupter to remove gas from the slurry stream.

The oil-water separator 72 is located at the second end 68 of the batch tank body 42 and separates oil from water using the relative densities and tendency for oil and water to separate. The oil-water separator 72 comprises an internal wall 76 and a spillway 78. The batch tank oil outlet 48 is located such that material enters the outlet from within a perimeter of the internal wall 76 of the oil-water separator 72. As the level of oil and water inside the tank body 42 rises, oil will tend to float on the surface of water. Thus, the oil floating on the water will fall over the spillway 78 and into the oil-water separator 72. The batch tank oil outlet 48 is located within the oil-water separator 72. The batch tank water outlet 50 is located outside the oil-water separator 72 at a level below the boundary between oil and water within the batch tank body 42. The sand separator 73 comprises a baffle system such that sand which enters through the batch tank inlet port 44 may easily enter the sand separator but is less likely to exit the sand separator. The sand separator 73 causes sand to collect proximate the clearout ports 52 described with reference to FIG. 1.

The static tree 74 dissipates static electricity caused by frictional forces of the gas over metal surfaces, reducing the possibility of a spark within the tank body 42. The mist collector 75 provides additional contact surface for the gas within the tank both 42, allowing liquid carried by the gas to condense and drip into the liquid in the tank body.

As shown in FIG. 2, an external gas coalescer 80 is located near the second end 68 of the batch tank body 42. The external gas coalescer 80 comprises a Venturi valve 82 or other throttling mechanism and at least one condensate return port 84. As gas exits the batch tank body 42 from the batch tank gas outlet port 46, it may carry entrained liquids. The gas is forced through the Venturi valve 82, causing the liquids to condense. The liquid then is returned to the batch tank body 42 through the at least one condensate return port 84.

With reference now to FIG. 3, the ventless tank system 10 is shown in context with ancillary components. The ventless tank system 10 receives a feed stream at the separator inlet port 22 of the three phase separator 16. The feed stream is produced initially by a well 90. The well 90 may be any well capable of producing a stream of fossil fuels, including horizontally drilled wells, marginally producing wells, and others common in the industry. The feed stream is then diverted into a sand trap 92 for removal of solid particulate matter. Flowing through the sand trap 92 allows heavy sand to be trapped before it enters into the system 10 thus reducing the amount of damage to equipment associated with sand wash. The stream is then fed into a valve manifold 94 for adjustment of pressure and flow rate to the three phase separator 16.

The flares 56, 64 for use with the gas streams of the present invention are also shown. The flares 56, 64 comprise a stack 100 and a detonation device 102. The detonation device 102 prevents back-flow of gas from the stack into the various tanks and ignites the gas such that it is flared in the stack 100. As shown, it may be desired for the flares 56, 64 to be located on trailers 104 for ease of transportation.

Figure 4:
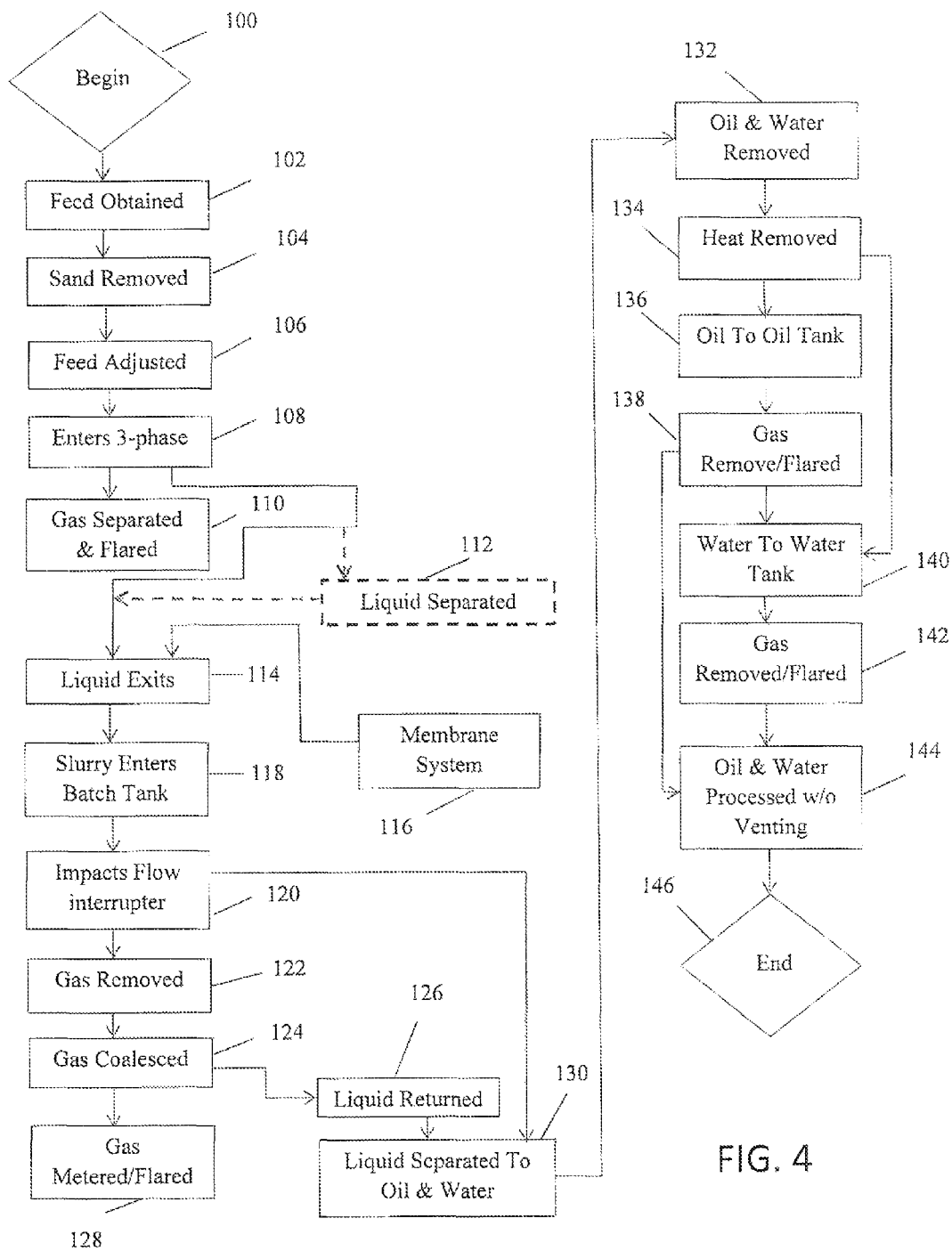
FIG. 4 is a flow chart showing a method for using a ventless tank system.

In operation, the ventless tank system 10 provides a method for separation and storage components from the well 90 without venting volatile organic compounds such as methane gas to the atmosphere. A diagrammatic representation of this method is shown in FIG. 4. Referring to FIGS. 1, 3 and 4, the method begins at step 100. A feed stream is obtained from well 90 at step 102. Sand is removed from the feed stream at step 104 by the sand trap 92. The pressure and flow rate of the feed stream is adjusted at step 106 by the valve manifold 94.

The feed stream enters the three phase separator 16 at step 108 through the separator inlet port 22. Gas is separated from the feed and flared at step 110. Liquid is optionally separated into oil and water at step 112 and exits the three phase separator 16 as a slurry stream at step 114. The membrane system 40 operates the separator liquid outlet port 26 at step 116, whether a single port or the separator water outlet port 32 and separator oil outlet port 34 as shown in FIG. 1. The slurry stream then enters the batch tank 12 at step 118. The slurry stream impacts the flow interrupter 70 at step 120, allowing gas to separate further from liquid. Gas is removed via the batch tank gas outlet 46 at step 122 and processed by a gas coalescer 80 at step 124. Liquids removed at the gas coalescer 80 are returned to the batch tank 12 at step 126 and remaining gas is metered and flared at step 128.

Liquid in the batch tank 12 is separated into oil and water by the oil-water separator 72 at step 130. Oil and water are removed from the batch tank at step 132. Heat is removed from the oil and water at the heat exchanger 14 at step 134 such that the equilibrium conditions of the oil and the water are less favorable for entrained dissolved gas than ambient conditions. Oil is placed in the oil tank 60 at step 136 and residual gas removed and flared at step 138. Water is placed in the water tank 62 at step 140 and residual gas removed and flared at step 142. The oil and the water may then be removed and processed at step 144 in a ventless manner. The process ends at step 146.

Various modifications can be made in the design and operation of the present invention without departing from its spirit. Thus, while the principal preferred construction and modes of operation of the invention have been explained in what is now considered to represent its best embodiments, it should be understood that within the scope of the appended claims, the invention may be practiced otherwise than as specifically illustrated and described.

The invention claimed is:

1. A tank system for managing a brine containing an organic gas comprising:
   a first tank body characterized by an internal first pressure, the body comprising:
      a main inlet port;
      a gas outlet port; and
      a liquid outlet port;
   a flow interrupter located within the first tank body proximate the main inlet port;
   a sand separator located within the first tank body;
   a flare line operatively connected to the gas outlet port; and
   a secondary tank in communication with the liquid outlet port, wherein the conditions in the secondary tank are such that liquid in the secondary tank has less organic gas dissolved in solution than exists at equilibrium at standard temperature and pressure.

2. The tank system of claim 1 wherein the flow interrupter comprises a deflector plate.

3. The tank system of claim 1 further comprising:
   a liquid transmission line disposed between the liquid outlet port and the secondary tank; and
   a heat exchanger located on the liquid transmission line to remove heat from the transmission line.

4. The tank system of claim 1 wherein the first tank body further comprises a plurality of liquid outlet ports.

5. The tank system of claim 1 further comprising a low pressure flare line operatively connected to the secondary tank.

6. The tank system of claim 1 wherein the flow interrupter comprises a gas buster line.

7. The tank system of claim 1 further comprising a static tree to discharge static electricity within the first tank body.

8. The tank system of claim 1 further comprising a mist collector located in the first tank body such that entrained liquid within the first tank body is collected.

9. A method for removing an organic gas from a brine stream comprising:
   directing the brine stream to a first tank comprising a first liquid outlet port and a first gas outlet port;
   separating the brine stream into a slurry stream and a gas stream;
   separating sand from the slurry stream to create a liquid stream;
   removing the liquid stream at the first liquid outlet port;
   removing the gas stream at the first gas outlet port;
   directing the liquid stream from the first liquid outlet port into a second tank, the second tank being characterized by a lower pressure than the first tank such that dissolved organic gas desorbs from the liquid stream; and
   removing the liquid stream from the second tank at a second liquid outlet port
   wherein the liquid stream removed from the second liquid outlet port contains less of the organic gas than exists at equilibrium at standard temperature and pressure.

10. The method of claim 9 wherein the step of separating a product stream into the slurry stream and the gas stream comprises:
   providing a deflector plate within the first tank;
   causing the brine stream to impact the deflector plate; and
   collecting the slurry stream.

11. The method of claim 9 wherein the step of separating the sand from the slurry stream comprises providing a baffle.

12. The method of claim 9 further comprising the step of providing a plurality of liquid outlet ports in the first tank body.

13. The method of claim 9 further comprising removing static electricity from the gas stream with a static tree.

14. The method of claim 9 further comprising removing gas from the brine stream in a third tank prior to directing the brine stream to the first tank body.

15. The method of claim 9 further comprising collecting vapor from within the gas stream and returning the collected vapor to the liquid stream.

16. The method of claim 9 wherein the liquid stream comprises oil and water.

17. The method of claim 16 further comprising the step of separating the oil from the water.

18. The method of claim 17 wherein the water is separated from the oil in the first tank.

19. A tank system for removing a volatile organic gas from liquid solution comprising:
   a first tank body characterized by an internal first pressure comprising:
      a first tank inlet port;
      a first tank gas outlet port; and
      a first tank liquid outlet port;
   a second tank body characterized by a second internal pressure comprising:
      a second tank inlet port;
      a second tank gas outlet port; and
      a second tank liquid outlet port;
   a first liquid transmission line disposed between the first tank liquid outlet port and the second tank inlet port;
   a heat exchanger located on the first liquid transmission line to cool liquid within the first liquid transmission line;
   a first gas flare line connected to the first tank gas outlet port; and
   a second gas flare line connected to the second tank gas outlet port;
   wherein the internal first pressure is greater than the internal second pressure.

20. The system of claim 19 further comprising:
   a third tank body characterized by a third internal pressure comprising:
      a third tank inlet port;
      a third tank gas outlet port; and
      a third tank liquid outlet port;

wherein the internal third pressure is higher than the internal first pressure and the liquid solution exiting through the third tank liquid outlet port is directed to the first tank inlet port.

21. The system of claim 19 wherein the liquid solution comprises water.

22. The system of claim 19 wherein the first tank body further comprises a sand separator.

23. The system of claim 19 wherein the first tank body comprises a plurality of first tank liquid outlet ports, wherein each first tank liquid outlet port is characterized by a different height.

* * * * *

UNITED STATES PATENT AND TRADEMARK OFFICE
CERTIFICATE OF CORRECTION

| | | |
|---|---|---|
| PATENT NO. | : 9,034,086 B2 | Page 1 of 1 |
| APPLICATION NO. | : 13/677493 | |
| DATED | : May 19, 2015 | |
| INVENTOR(S) | : Daniels et al. | |

It is certified that error appears in the above-identified patent and that said Letters Patent is hereby corrected as shown below:

In the Specification

Column 4, line 16, please delete "both" and substitute therefore --body--.

Signed and Sealed this
First Day of September, 2015

Michelle K. Lee
*Director of the United States Patent and Trademark Office*